(12) United States Patent
Hirth et al.

(10) Patent No.: US 11,441,469 B2
(45) Date of Patent: Sep. 13, 2022

(54) CATALYST HAVING A METAL HONEYCOMB BODY

(71) Applicant: Vitesco Technologies GMBH, Hannover (DE)

(72) Inventors: Peter Hirth, Rösrath (DE); Florian Rings, Lohmar (DE)

(73) Assignee: Vitesco Technologies GmbH, Hannover (DE)

( * ) Notice: Subject to any disclaimer, the term of this patent is extended or adjusted under 35 U.S.C. 154(b) by 0 days.

(21) Appl. No.: 17/183,883

(22) Filed: Feb. 24, 2021

(65) Prior Publication Data
US 2021/0178379 A1 Jun. 17, 2021

Related U.S. Application Data

(63) Continuation of application No. PCT/EP2019/072740, filed on Aug. 27, 2019.

(30) Foreign Application Priority Data

Sep. 3, 2018 (DE) .......................... 10 2018 214 929

(51) Int. Cl.
*F01N 3/28* (2006.01)
*B01D 53/86* (2006.01)
*B01J 35/04* (2006.01)

(52) U.S. Cl.
CPC ............. *F01N 3/281* (2013.01); *B01D 53/86* (2013.01); *B01J 35/04* (2013.01); *B01D 2255/9155* (2013.01)

(58) Field of Classification Search
None
See application file for complete search history.

(56) References Cited

U.S. PATENT DOCUMENTS

| 4,652,286 A | 3/1987 | Kusuda et al. |
| 5,232,671 A | 8/1993 | Brunson et al. |
| 5,302,355 A | 4/1994 | Fujikura et al. |
| 5,405,422 A | 4/1995 | Ueda et al. |

(Continued)

FOREIGN PATENT DOCUMENTS

| CN | 101119801 A | 2/2008 |
| CN | 104160125 A | 11/2014 |

(Continued)

OTHER PUBLICATIONS

German Office Action dated Feb. 12, 2021 for corresponding German Patent Application No. 102018214929.1.

(Continued)

*Primary Examiner* — Jelitza M Perez

(57) ABSTRACT

A catalyst for cleaning exhaust gases, having a honeycomb body which configures a plurality of flow ducts through which a gas from a gas inlet side may flow in the axial direction to a gas outlet side, having an inner casing which encloses the honeycomb body having an outer casing which encloses the inner casing, and having an insulation region which is disposed between the inner casing and the outer casing. The honeycomb body, the inner casing, the outer casing and the insulation region are formed from exactly two tiers formed from metal foils that are stacked on top of one another and wound along a winding direction transverse to the axial direction.

11 Claims, 4 Drawing Sheets

(56) References Cited

U.S. PATENT DOCUMENTS

| | | | |
|---|---|---|---|
| 5,651,906 A * | 7/1997 | Whittenberger | F01N 3/2814 422/174 |
| 7,241,427 B2 | 7/2007 | Nagel et al. | |
| 7,981,498 B2 | 7/2011 | Maus et al. | |
| 8,071,505 B2 | 12/2011 | Ebener et al. | |
| 9,260,999 B2 | 2/2016 | Plati et al. | |
| 9,540,978 B2 | 1/2017 | Hirth et al. | |
| 2002/0034460 A1 | 3/2002 | Bruck et al. | |
| 2002/0061268 A1 | 5/2002 | Bruck et al. | |
| 2002/0174770 A1 | 11/2002 | Badeau | |
| 2003/0007906 A1 | 1/2003 | Nagel et al. | |
| 2003/0175776 A1 | 9/2003 | Nakao et al. | |
| 2008/0118700 A1 | 5/2008 | Tsuchiya et al. | |

FOREIGN PATENT DOCUMENTS

| | | |
|---|---|---|
| DE | 2302746 A1 | 7/1974 |
| DE | 4306053 A1 | 9/1993 |
| DE | 102007008823 A1 | 8/2008 |
| DE | 102017002266 A1 | 9/2017 |
| EP | 0810353 A1 | 12/1997 |
| JP | H07197813 A | 8/1995 |
| JP | H08141409 A | 6/1996 |
| JP | H1085612 A | 4/1998 |
| JP | 2002178068 A | 6/2002 |
| JP | 2013017966 A | 1/2013 |
| TW | 512199 B | 12/2002 |
| WO | 9305862 A1 | 4/1993 |
| WO | 9612876 A1 | 5/1996 |
| WO | 9616526 A1 | 5/1996 |
| WO | 0005532 A1 | 2/2000 |
| WO | 0126808 A1 | 4/2001 |
| WO | 0179670 A1 | 10/2001 |
| WO | 03050397 A2 | 6/2003 |
| WO | 2007097237 A1 | 8/2007 |
| WO | 2012074735 A1 | 6/2012 |
| WO | 2014081854 A1 | 5/2014 |

OTHER PUBLICATIONS

International Search Report and Written Opinion dated Oct. 2, 2019 from corresponding International Patent Application No. PCT/EP2019/07274.

* cited by examiner

CATALYST HAVING A METAL HONEYCOMB BODY

CROSS-REFERENCE TO RELATED APPLICATIONS

This application claims priority to PCT Application PCT/EP2019/072740, filed Aug. 27, 2019, which claims priority to German Patent Application No. DE 10 2018 214 929.1, filed Sep. 3, 2018. The disclosures of the above applications are incorporated herein by reference.

FIELD OF THE INVENTION

The invention relates to a catalyst for cleaning exhaust gases, having a honeycomb body which configures a plurality of flow ducts through which a gas from a gas inlet side flows in the axial direction to a gas outlet side, having an inner casing which encloses the honeycomb body, having an outer casing which encloses the inner casing, and having an insulation region which is disposed between the inner casing and the outer casing.

BACKGROUND OF THE INVENTION

Catalysts from metallic honeycomb bodies in many variations are known from the prior art. The honeycomb bodies are usually produced by stacking a plurality of metal foils on top of one another and subsequently winding the metal foils. The honeycomb bodies are subsequently inserted into a tubular casing and connected to the latter in a materially integral manner. In order to achieve thermal insulation in relation to the environment of the catalyst, the casing is embodied having a plurality of parts. Specifically, the casing is divided into an outer casing and an inner casing, wherein an air gap which serves for thermal insulation is created between an outer casing and an inner casing.

It is disadvantageous in the devices in the prior art that the catalysts are constructed having a plurality of parts, this increasing the complexity of the component and the production of the latter, on the one hand, and on the other hand the insufficient thermal insulation effect which is generated by a single encircling air gap, for example. This insulation effect is no longer sufficient at high temperatures, and an unwanted heat loss arises.

SUMMARY OF THE INVENTION

It is therefore the object of the present invention to achieve a catalyst which has a metal honeycomb body of a simple construction and is able to be adapted flexibly to the respective specific application thereof.

The object in terms of the catalyst is achieved by a catalyst having the features described herein.

One embodiment of the invention relates to a catalyst for cleaning exhaust gases, having a honeycomb body which configures a plurality of flow ducts through which a gas from a gas inlet side flows in the axial direction to a gas outlet side, having an inner casing which encloses the honeycomb body, having an outer casing which encloses the inner casing, and having an insulation region which is disposed between the inner casing and the outer casing, the honeycomb body, the inner casing, the outer casing and the insulation region being formed from exactly two tiers formed from metal foils that are stacked on top of one another and wound along a winding direction transverse to the axial direction.

The catalyst according to the invention is distinguished in that the catalyst is produced entirely from the two metal foils, or from the tiers formed from the metal foils, respectively. The honeycomb body, the inner casing, the outer casing and the insulation region are produced in one piece from the two tiers. The assembly processes and the joining processes between the honeycomb body, the casings and the insulation region are thus dispensed with.

The axial direction refers to the direction along which the flow ducts configured by the honeycomb body substantially extend.

The winding direction lies so as to be transverse to the axial direction and extends along the longer extent of the tiers. The individual portions of the first tier are also lined up along the winding direction.

The individual elements of the catalyst are completely formed by winding the tiers; the elements of the catalyst are produced by the dissimilar properties of the individual portions of the first tier. This offers the advantage that the elements by virtue of the common first and second tier are already integrally connected to one another and do not have to be subsequently assembled and connected.

It is advantageous for the first tier to be at least partially structured and for the second tier to be smooth.

In an embodiment, the dissimilar structures of a catalyst are produced in a simple manner on account of an at least partially structured first tier which has corrugations or the like, for example, and a second smooth tier, the tiers stacked on top of one another and conjointly wound. On account of a corrugated portion of the first tier, flow ducts which ultimately extend in the axial direction through the honeycomb body are generated as a consequence of the winding.

On account of a non-structured region of the first tier in conjunction with the second tier, a casing is produced that delimits the honeycomb body in the radial direction, for example.

By providing a second smooth tier it is prevented that the first tier when winding catches on radially inner or outer regions, for example in that the structures formed therein engage in one another. A physical separation of the layers produced by the first tier is achieved by providing the smooth second tier.

The smooth tier does not mandatorily need to be completely smooth, but may also have a significantly weaker corrugation than the partially structured tier. In an embodiment, the smooth tier includes so-called micro-corrugation, which are distinguished by low corrugation heights.

It is also advantageous for the first tier to be divided into a plurality of portions which are disposed adjacent to one another along the winding direction. On account of these portions, which may in each case be configured differently in terms of their structure, the different elements of a catalyst are advantageously produced having a common tier.

A preferred embodiment is characterized in that the first tier has alternating structured and smooth portions.

It is also preferable for the first portion of the first tier, conjointly with the second tier, to configure the honeycomb body having the flow ducts. To this end, the first portion has, for example, a corrugation which when being wound up in conjunction with the second tier placed thereon forms the individual flow ducts. The cross section and the cell density of the flow ducts may be influenced by way of the design of the corrugation of the first portion. The number of flow ducts produced and the size of the honeycomb body produced by the winding may be influenced by way of the length of the first portion.

In addition, it is advantageous if the second portion of the first tier, conjointly with the second tier, configures the inner casing which in the radial direction delimits the region capable of a through flow.

A compact inner casing is formed on account of a smooth second portion in conjunction with the smooth second tier and the winding. The radial thickness of the inner casing is influenced as a function of the length of the second portion. If the second portion is comparatively long, multiple wrapping may take place by the honeycomb body that is produced by the first portion, the inner casing becoming thicker and more stable on account thereof.

It is also advantageous for the third portion of the first tier, conjointly with the second tier, to configure the insulation region which spaces the inner casing from the outer casing.

The insulation region serves for thermally insulating the honeycomb body in relation to the environment of the catalyst. Specifically, the heat dissipation away from the catalyst is to be reduced so that an ideally high efficiency of the catalyst is achieved.

The heat dissipation in the radial direction is restricted on account of an ideally thick insulation region. The third portion may likewise have beads or corrugations which when winding the two tiers produce a spacing from the respective tiers formed subsequently by the further winding, for example. The greatest possible volume of air enclosed by the individual tiers of the insulation region is thus generated.

Additionally, the third portion may have coatings which reduce the heat dissipation or increase the degree of reflection such that the thermal radiation is reflected radially back in the direction of the honeycomb body.

It is also expedient for the fourth portion of the first tier, conjointly with the second tier, to configure the outer casing which in the radial direction outwardly delimits the catalyst.

The fourth portion is preferably not structured and serves for configuring the outer casing which closes off the honeycomb body, the inner casing and the insulation region in relation to the outside. The outer casing moreover also serves for connecting the catalyst to other pipes or housings of a device for the post-treatment of exhaust gas.

The fourth portion in the axial direction may therefore also have a greater extent than the first tier has in the remaining portions. An outer casing that protrudes in the axial direction and thus forms linking points for the housing and pipelines is produced on account thereof.

In a manner similar to that of the second portion which forms the inner casing, the fourth portion is also modified in such a way that the outer casing has a greater thickness. The outer casing may also have thermally insulating coatings in order to reduce any radial heat dissipation.

It is moreover advantageous for the third portion and/or the fourth portion of the first tier to be coated with a coating that reduces the emissivity and/or with a coating that has a lower thermal conductivity than the base material of the tier. The thermal conduction and thermal radiation in the radial direction toward the outside is reduced on account of coatings of this type. This leads to a higher temperature in the region of the honeycomb body and thus to a better efficiency of the catalyst.

Since the emissivity is to be very low, or approximately zero, respectively, the metal foils that configure the tiers over the majority of the extent thereof should have purely metallic surfaces or surfaces with low emissivities. For example, metallic coatings that have an even higher degree of reflection than the metals of the metal foils per se are suitable.

Ceramic coatings such as oxides of aluminum (Al), silicon (Si), cerium (Ce), zirconium (Zr) or similar, as well as PVD coatings (physical vapor deposition) or CVD coatings (chemical vapor deposition) tend to have higher emissivities and are therefore unsuitable for the application according to the invention. However, since these coatings have very low thermal conductivities, it is expedient for the coatings to be used on limited regions of the metal foils, such as in regions where the tiers contact one another.

It is therefore advantageous for the metal foils to have dissimilar coatings along the extent thereof, wherein it is possible to use coatings at the contact points between the tiers that differ from those coatings along the remaining extent.

Furthermore, it is expedient for the second portion of the first tier and/or the second tier to have bores that penetrate the tier at the end region that faces the gas inlet side and/or the end region that faces the gas outlet side. The respective surface or the configured heat-conducting cross section of the individual portions is reduced in a targeted manner by way of bores or openings of dissimilar types. The thermal conduction in the axial direction of the honeycomb body or transversely to this direction is reduced by a targeted reduction of the surface. In an embodiment, bores and openings preferably have shapes related to the specific application and in terms of their dimensions and arrangement may also be tailored to the respective application.

Other embodiments of the present invention are described in the following description of the figures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention will be explained in detail hereunder by means of exemplary embodiments with reference to the drawings. In the drawings.

DETAILED DESCRIPTION OF THE PREFERRED EMBODIMENTS

The following description of the preferred embodiment(s) is merely exemplary in nature and is in no way intended to limit the invention, its application, or uses.

Figure 1:
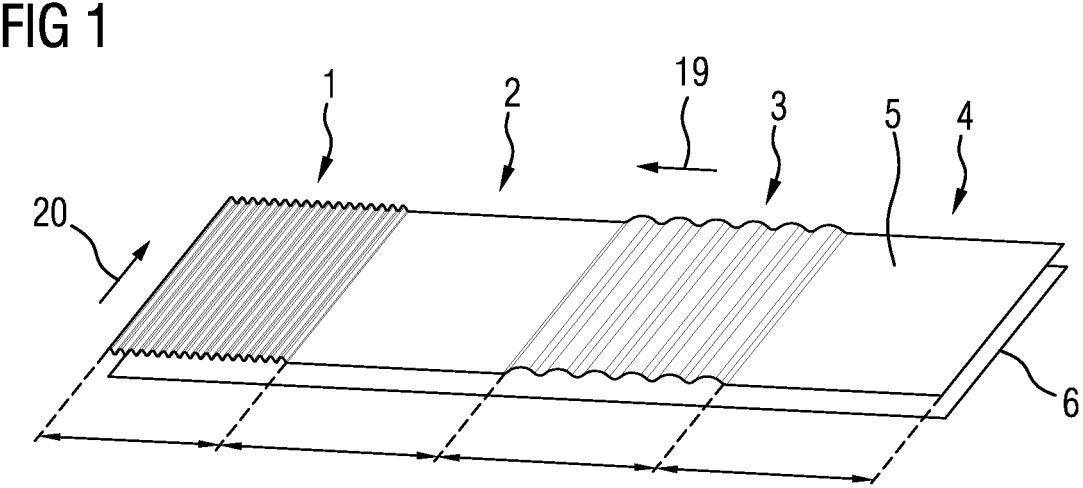
FIG. 1 shows a perspective view of the two tiers stacked one on top of the other which form the catalyst.

FIG. 1 shows a perspective view of the two metal foils which form the first tier 5 and the second tier 6. The two tiers 5, 6 are rectangular and have a comparatively short extension in a direction 20, which corresponds to the axial direction of the finished wound honeycomb body, and a comparatively long extension along the direction 19, which corresponds to the winding direction along which the tiers 5, 6 are wound up so as to form to the honeycomb body or the complete catalyst.

The first tier 5 has four portions which are disposed beside one another in the direction 19 and form different regions of the finished catalyst. The second tier 6 is embodied so as to be completely smooth.

When viewed from the left to the right, the first tier 5 has the portions 1 to 4.

The portion 1 has a corrugation, wherein the wave crests and wave troughs run parallel to direction 20. In the wound state, the portion 1 configures the actual honeycomb body, such that the corrugation in conjunction with the smooth tier 2 configures the individual flow ducts through which a flow may flow in the axial direction 20.

The portion 2 is embodied so as to be smooth and, conjointly with the second tier 6, configures the inner casing which delimits the honeycomb body in the radial direction and thus delimits the face through which the exhaust gas may flow. On account of the smooth design embodiment of the two tiers 5, 6 in the portion 2 it is achieved that the inner casing is likewise smooth and both tiers 5, 6 upon winding lie close together in this region. On the one hand, this increases the stability and, on the other hand, also enables a high temperature stability to be generated. The inner casing, as a function of the length of the second portion, is designed so as to be more or less thick and therefore stable.

The third portion of the first tier 5 likewise has a corrugation, wherein the corrugation density is lower in the example shown. The insulation region, which is disposed between the inner casing formed by portion 2 and the outer casing formed by portion 4, is produced conjointly with the smooth portion of the second tier 6 during winding.

The insulation region is formed by the corrugation of low corrugation density shown in an exemplary manner; alternatively, other shapes of the portion 3 of the first tier 5 may also be selected.

The portion 4 of the first tier 5 and the second tier 6 are both embodied so as to be smooth and, in the wound state configure the outer casing which simultaneously closes off the catalyst in the radial direction.

Figure 2:
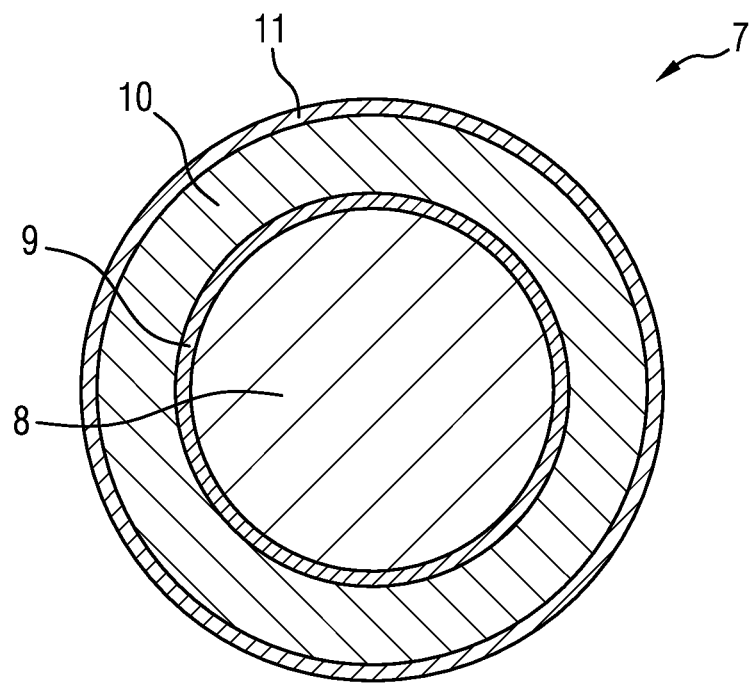
FIG. 2 shows a sectional view through the wound catalyst.

FIG. 2 shows a cross section through a catalyst 7 according to the invention, wherein the individual elements, i.e. the honeycomb body 8, the inner casing 9, the insulation region 10 and the outer casing 11 are shown, the elements having been produced by winding the two tiers 5, 6 that are stacked on top of one another.

Figure 3:
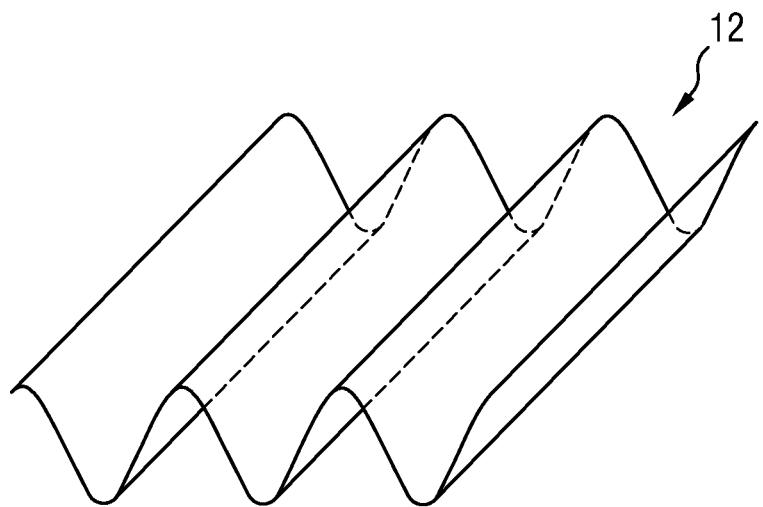
FIG. 3 shows a schematic view of the corrugation and how individual portions of the tiers may have these corrugations.

FIG. 3 shows a corrugation 12 as is molded into the different portions 1 to 4 of the first tier 5. The number of contact points between the outer casing and the inner casing is influenced by varying the corrugation height and the corrugation density. Since the objective is to allow as little heat transfer as possible from the inner casing to the outer casing, it is advantageous for the number of direct contact points between the inner casing and the outer casing to be as low as possible.

Figure 4:
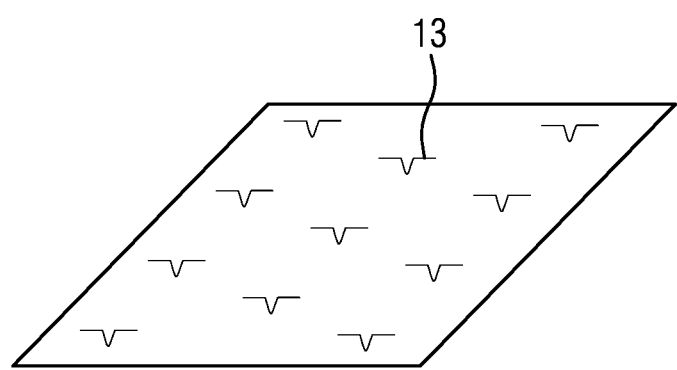
FIG. 4 shows a schematic view of a nub structure and how individual portions of the tiers may have this nub structure.

FIG. 4 shows an alternative shaping for the portions 1 to 4 of the first tier 5. Embossed nubs 13 further reduce the contact face between the inner casing and the outer casing, while at the same time further ensuring the necessary spacing for the configuration of the insulation region. The thermal conduction in the axial direction, but also in the radial direction, is minimized on account of a nub structure 13.

Figure 5:
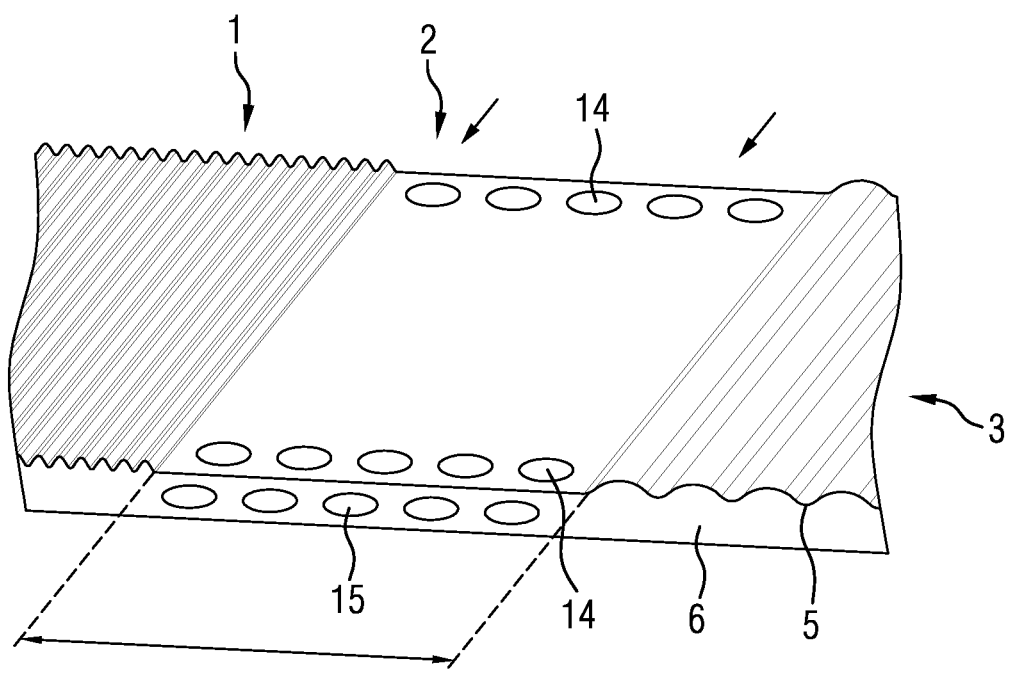
FIG. 5 shows a perspective view of the second portion of the first tier and the second tier, where the second portion at the axial end regions thereof has perforations, and the second tier also perforations.

FIG. 5 shows a view of the first tier 5 and more specifically the portion 2. In order for thermal conduction in the axial direction to be reduced, the portion 2 at the axial end regions thereof has perforations 14. The perforations 14 are embodied on one or both sides. The second tier 6 indicated therebelow may also have perforations 15 in the region that bears on the portion 2. The heat transfer in the axial direction toward the gas inlet or the gas outlet is reduced by reducing the material at the axial end regions which in the wound state form the gas inlet side or the gas outlet side, respectively. On account thereof, the cooling of the catalyst and more specifically the cooling of the honeycomb body is reduced.

Figure 6:
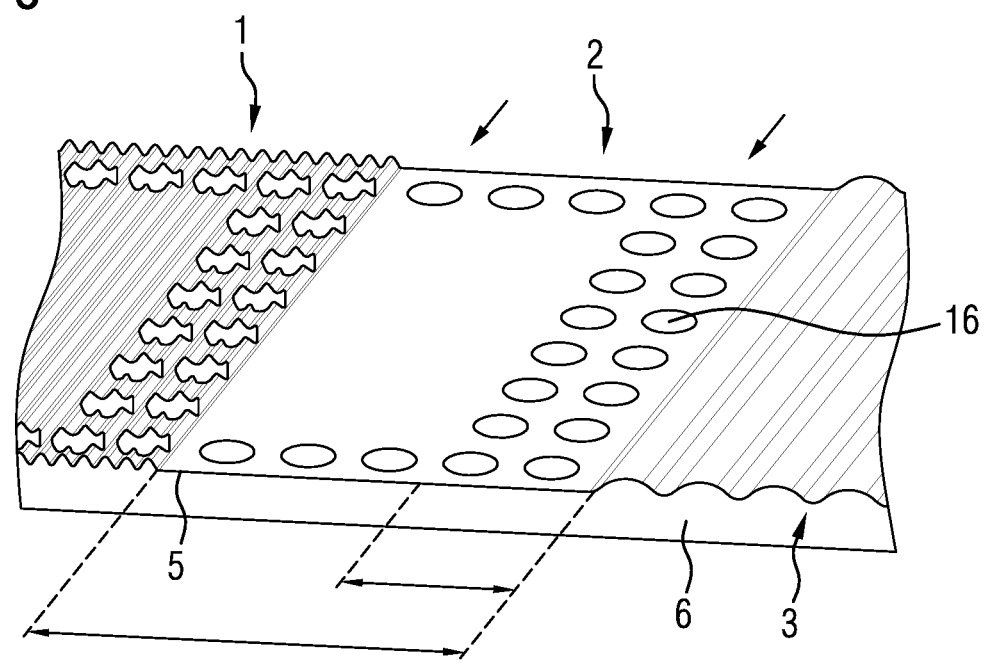
FIG. 6 is a perspective view of the first tier and the second tier, with the first tier including perforations disposed on the axial end regions and within a defined region in the axial direction between the end regions.

FIG. 6 shows a design embodiment of the first tier 5, wherein perforations 16 are disposed on the axial end regions as well as within a defined region in the axial direction between the end regions. In the example of FIG. 6 these perforations 16, such as on portions 1 and 2, are in each case disposed on the transition region to the portions 2 and 3.

In addition to reducing the thermal conduction in the axial direction by the measures that were shown in FIG. 5, the undesired thermal conduction in the radial direction is also to be reduced on account thereof.

Figure 7:
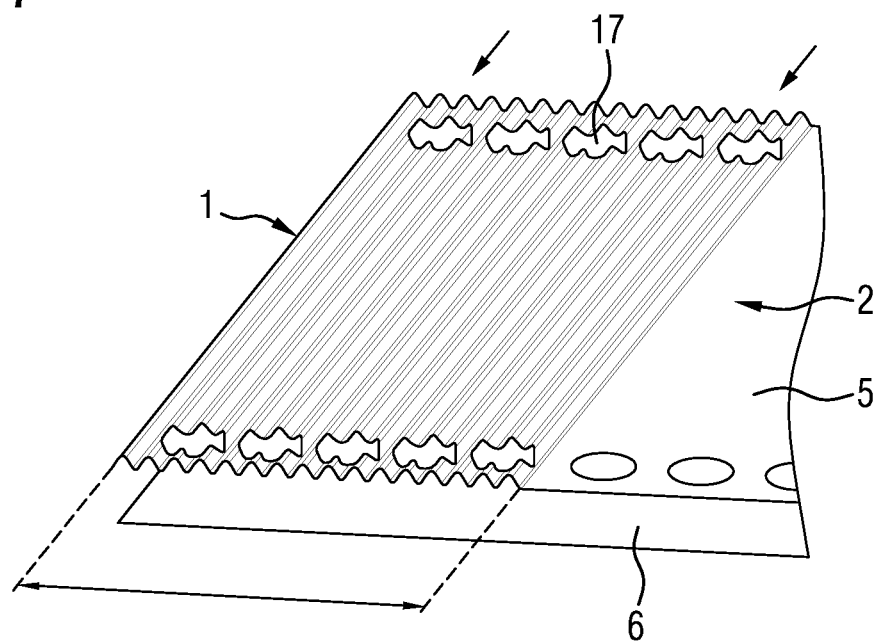
FIG. 7 is a perspective view of the first tier having perforations in the region of the axial end regions of the first portion.

FIG. 7 shows the potential disposal of perforations 17 in the region of the axial end regions of portion 1; the undesirable thermal conduction to the later end faces on the gas inlet side and the gas outlet side is likewise to be reduced on account thereof.

Figure 8:
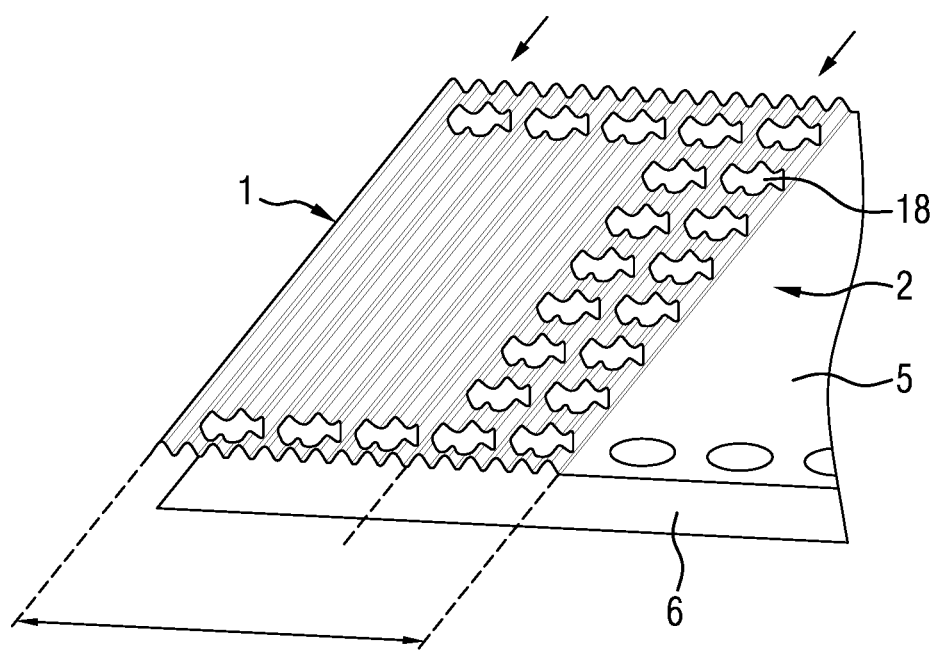
FIG. 8 is a perspective view of the first tier having perforations on the axial end regions of the first portion of the first tier and on the peripheral region of the first portion that faces the second portion.

FIG. 8 shows disposal of the perforations 18 on the axial end regions of the portion 1 of the first tier 5 and on the peripheral region of the portion 1 that faces the portion 2. This is intended to reduce the thermal conduction in the axial direction and also in the radial direction.

In addition to the various perforations, the tiers 5, 6 may also have coatings that reduce the thermal radiation.

The exemplary embodiments of FIGS. 1 to 8 are not of a restrictive nature and serve to illustrate the concept of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A catalyst for cleaning exhaust gases, comprising:
   a honeycomb body which configures a plurality of flow ducts through which a gas from a gas inlet side flows in the axial direction to a gas outlet side;
   an inner casing which encloses the honeycomb body;
   an outer casing which encloses the inner casing; and
   an insulation region which is disposed between the inner casing and the outer casing;
   wherein the honeycomb body, the inner casing, the outer casing and the insulation region are formed from a first tier and a second tier formed from metal foils that are stacked on top of one another and wound along a winding direction transverse to the axial direction.

2. The catalyst of claim 1, wherein the first tier is at least partially structured, and the second tier is at least partially smooth.

3. The catalyst of claim 2, the first tier further comprising a plurality of portions which are disposed adjacent to one another along the winding direction.

4. The catalyst of claim 3, the first tier further comprising alternating structured and smooth portions.

5. The catalyst of claim 3, wherein a first portion of the first tier conjointly with the second tier forms at least a portion of the honeycomb body having the plurality of flow ducts.

6. The catalyst of claim 3, wherein a second portion of the first tier con-jointly with the second tier forms at least a portion of the inner casing which in the radial direction delimits the region capable of a through flow.

7. The catalyst of claim 3, wherein a third portion of the first tier conjointly with the second tier forms at least a portion of the insulation region which spaces the inner casing from the outer casing.

8. The catalyst of claim 3, wherein a fourth portion of the first tier conjointly with the second tier forms at least a portion of the outer casing which in the radial direction outwardly delimits the catalyst.

9. The catalyst of claim 3, further comprising:
a first coating which reduces emissivity; and
a second coating having a lower thermal conductivity than a base material of the first tier;
wherein at least one of a third portion or a fourth portion of the first tier is coated with at least one of the first coating or the second coating.

10. The catalyst of claim 3, a second portion of the first tier further comprising bores that penetrate the first tier in at least one of an end region that faces the gas inlet side or an end region that faces the gas outlet side.

11. The catalyst of claim 3, the second tier further comprising bores that penetrate the second tier in at least one of an end region that faces the gas inlet side or an end region that faces the gas outlet side.

* * * * *